US007607103B2

(12) United States Patent
Thompson

(10) Patent No.: US 7,607,103 B2
(45) Date of Patent: Oct. 20, 2009

(54) VIRTUAL BEVERAGE BAR DESIGN AND ANALYSIS SYSTEM

(75) Inventor: Thomas Thompson, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 292 days.

(21) Appl. No.: 10/538,596

(22) PCT Filed: Dec. 12, 2003

(86) PCT No.: PCT/US03/39709

§ 371 (c)(1),
(2), (4) Date: Jun. 9, 2005

(87) PCT Pub. No.: WO2004/053682

PCT Pub. Date: Jun. 24, 2004

(65) Prior Publication Data

US 2006/0080349 A1    Apr. 13, 2006

(51) Int. Cl.
*G06F 3/00* (2006.01)
(52) U.S. Cl. .................. 715/771; 715/765; 715/769; 715/775; 700/232; 700/233; 700/236
(58) Field of Classification Search .................. 715/771, 715/764, 757, 765, 769, 775, 848; 705/27; 700/214, 231–244
See application file for complete search history.

(56) References Cited

U.S. PATENT DOCUMENTS

| | | | | |
|---|---|---|---|---|
| 5,777,895 A * | 7/1998 | Kuroda et al. | ............... | 702/188 |
| 5,988,346 A * | 11/1999 | Tedesco et al. | ............... | 194/217 |
| 5,995,729 A * | 11/1999 | Hirosawa et al. | ............... | 703/1 |
| 6,021,394 A * | 2/2000 | Takahashi | ............... | 705/10 |
| 6,230,150 B1 * | 5/2001 | Walker et al. | ............... | 705/400 |
| 6,384,850 B1 | 5/2002 | McNally et al. | | |
| 6,397,193 B1 * | 5/2002 | Walker et al. | ............... | 705/16 |
| 6,462,644 B1 * | 10/2002 | Howell et al. | ............... | 340/5.92 |
| 7,236,946 B2 * | 6/2007 | Bates et al. | ............... | 705/26 |
| 2002/0049708 A1 | 4/2002 | Moneymaker et al. | | |
| 2003/0101257 A1 * | 5/2003 | Godwin | ............... | 709/223 |
| 2003/0105661 A1 * | 6/2003 | Matsuzaki et al. | ............... | 705/10 |
| 2003/0154131 A1 | 8/2003 | Tsang | | |
| 2003/0172003 A1 * | 9/2003 | Holbrook et al. | ............... | 705/27 |

(Continued)

OTHER PUBLICATIONS

Notification of Transmittal of International Preliminary Report on Patentability for PCT/US2003/39709, International Filing Date Dec. 12, 2003. Date of completion of report May 31, 2005.

(Continued)

*Primary Examiner*—Ba Huynh
(74) *Attorney, Agent, or Firm*—Barnes & Thornburg, LLP

(57) ABSTRACT

A system, method and computer program product for planning an arrangement of beverage equipment on a virtual surface or counter. The system allows a user to create a virtual surface of chosen dimension (32) and then select one or more beverage machines (36) to place on that surface while verifying that there is sufficient open space for the selected beverage machine (38). Also disclosed is a method of determining projected profit (48) based on the selection of beverage machines, entered values related to costs, and entered values related to serving size and pricing. The system reports on projected profits and/or how long the equipment needs to be operated to pay off the equipment's cost.

21 Claims, 22 Drawing Sheets

U.S. PATENT DOCUMENTS

2003/0182166 A1* 9/2003 Silver .............................. 705/7
2005/0043855 A1* 2/2005 Kimura ........................ 700/237
2005/0240605 A1* 10/2005 Knoblock et al. ........... 707/100
2006/0064201 A1* 3/2006 Chirnomas ................. 700/242
2008/0051934 A1* 2/2008 Tedesco et al. .............. 700/236

OTHER PUBLICATIONS

International Search Report for International Application, PCT/US2003/39709. Date of completion of search Apr. 11, 2004.

* cited by examiner

EXIT
START

| COFFEE | ICED TEA | GRINDERS | SPECIALTY | HOT WATER |

| COFFEE | ICED TEA | | GRANITA | |

| COST PER OUNCE (6): | .02 | PRICE PER SERVING (6): | 89 |
| SERVING SIZE (oz): | 16 | # OF SERVINGS PER DAY: | 40 |
| PERCENT OF REFILLS: | 5 | CHARGE PER REFILL ($): | 0 |
| # OF LOCATIONS: | 1 | COFFEE PROFIT FOR ONE YEAR: $8,088.40 |

UNIT DIMENSIONS
259.53  40.47

DISPENSER/BREWER
REMOVE  ADD  BACK  DONE

SELECT THE BEVERAGE AND CHANGE THE VALUES TO SHOW YOUR PROFIT.

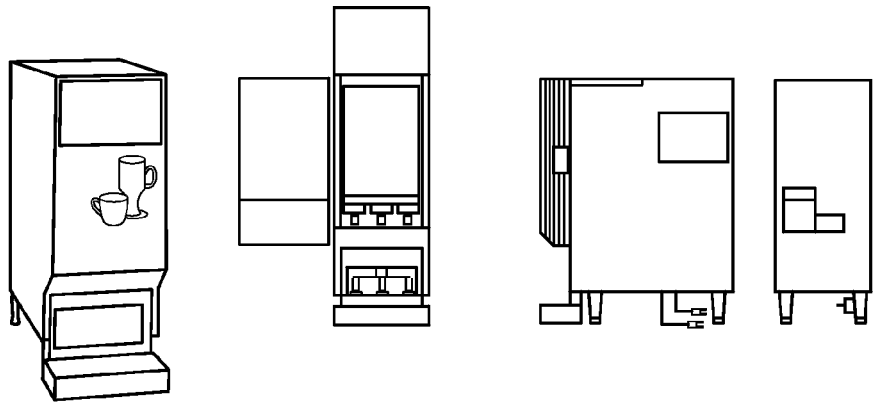

| DIMENSIONS AND SPECIFICATIONS | | | | | | | | | |
|---|---|---|---|---|---|---|---|---|---|
| MODEL | PRODUCT # | VOLTS | AMPS | TANK HEATER WATTS | TOTAL WATTS | CAPACITY | CU. FT. | SHIPPING WEIGHTS | CON ATTACH |
| FMD-3 BLK | 28200.0000 | 120 | 15 | 1700 | 1800 | 4.2 gal./hr | 8.4 | 86 lbs. (39.0kg) | YES |
| FMD-3 SS | 28200.0006 | 120 | 15 | 1700 | 1800 | 4.2 gal./hr | 8.4 | 78 lbs. (35.4kg) | YES |
| FMD-3 SS | 28200.0007 | 120/240 | 15.8 | 3500 | 3600 | 8.5 gal./hr | 8.4 | 79 lbs. (35.9kg) | YES |
| FMDS-3 BLK | 28600.0000 | 120 | 15 | 1700 | 1800 | 4.2 gal./hr | 8.3 | 84 lbs. (38.1kg) | YES |

NOTE: SS=STAINLESS STEEL CABINET WITH BLACK DOOR. BLK = BLACK DOOR

HOT POWDERED DRINK PROFIT

COST PER OUNCE: $0.04   # OF SERVINGS PER DAY: 20   # OF LOCATIONS: 10
PRICE PER SERVING: $1   SERVING SIZE (oz): 16

YEARLY HOT POWDERED DRINK PROFIT: $26,280.00

FIG. 19

| DIMENSIONS AND SPECIFICATIONS | | | | | | | | | |
|---|---|---|---|---|---|---|---|---|---|
| MODEL | PRODUCT # | VOLTS | AMPS | TANK HEATER WATTS | TOTAL WATTS | CAPACITY | CU. FT. | SHIPPING WEIGHTS | CON ATTACH |
| CDBCF15-APS | 29000.0100 | 120 | 14.20 | 1425 | 1700 | 4.5 gal./hr | 5.2 | 28lbs. (12.7kg) | YES |

COFFEE PROFIT

| | | |
|---|---|---|
| COST PER OUNCE: $0.02 | # OF SERVINGS PER DAY: 40 | CHARGE PER REFILL: $0 |
| PRICE PER SERVING: $0.89 | PERCENT OF REFILLS: 5 | # OF LOCATIONS: 10 |
| SERVING SIZE (oz): 16 | | |

YEARLY COFFEE PROFIT: $80,884.00

EXIT
START

COFFEE | ICED TEA | GRINDERS | SPECIALTY | HOT WATER

BEVERAGE BAR PROFIT FOR ONE YEAR (INCLUDING ALL LOCATIONS):

$101,897.05

THIS PROFIT IS A REPRESENTATION OF THE PROFIT YOU COULD ACHIEVE. IT DOES NOT INCLUDE ANY OTHER COST ASSOCIATED WITH RUNNING A BUSINESS. ACTUAL PROFIT MAY VARY DEPENDING ON INDIVIDUAL CIRCUMSTANCES.

PAYBACK CALCULATOR | PRINT

UNIT DIMENSIONS
96.30 | 5.70

BACK | TOTAL

CLICK THE "PRINT" BUTTON TO GET A HARD COPY TO TAKE WITH YOU.

VIRTUAL BEVERAGE BAR DESIGN AND ANALYSIS SYSTEM

BACKGROUND AND SUMMARY

Beverage machines are used to produce a variety of beverages in a variety of establishments such as, for example, cafeterias, restaurants, and convenience stores (collectively, "establishments"). Operators, managers, owners, and others in charge of such establishments (referred to hereinafter for simplicity as "Owners") are often faced with several tasks related to beverage machines. These tasks include, such as, for example, selecting a particular beverage machine, deciding on an arrangement or location for each piece of beverage equipment in the establishment, and ordering raw materials for use in the machine. It would be useful for Owners to have a tool to help them with such tasks.

In addition, Owners may also be responsible for analyzing the profitability of the purchased beverage machines or comparing the profitability of several beverage machines under consideration for purchase. It would be useful for owners to have a tool to assist them in such profitability analyses.

The present disclosure relates to a system, method, and computer program product for assisting owners in designing a beverage bar. The term "beverage bar" as used throughout this disclosure is meant to include any arrangement or configuration of one or more pieces of equipment, such as, but not limited to, beverage machines on a counter within an establishment. The system allows virtual manipulation of various beverage machines. The term beverage bar is intended to be expansively interpreted and is not limited to beverage equipment. Reference to "beverage" and "beverage equipment" is used for clarity and efficiency even though any type of equipment placement is contemplated under this application. Also provided is a system which functions to analyze the profitability of a particular beverage bar configuration. Finally, the system provides detailed specification sheets on the beverage machines selected to be included in the beverage bar for easy analysis and/or ordering.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures in which:

FIG. 13 is a screenshot of an interface for accepting or overriding cost information for coffee machines;

Figure 14:
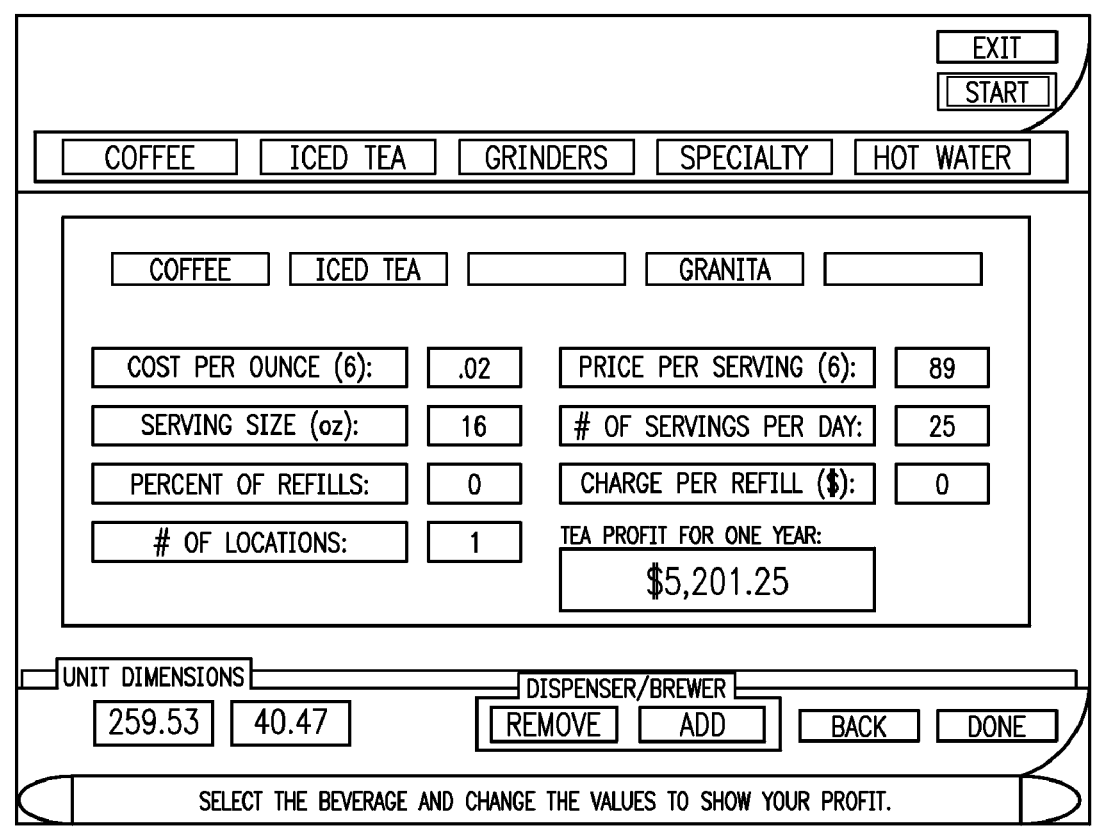

FIG. 14 is a screenshot of an interface for accepting or overriding cost information for iced tea machines;

FIGS. 19, & 20 are sample printouts of beverage machine specifications that are printed when the deluxe format is selected;

FIG. 21 is a screenshot of a total beverage bar screen showing a payback calculator button;

FIG. 22 is a screenshot in which a user can input beverage machine pricing information.

DETAILED DESCRIPTION OF THE DRAWINGS

Figure 1:
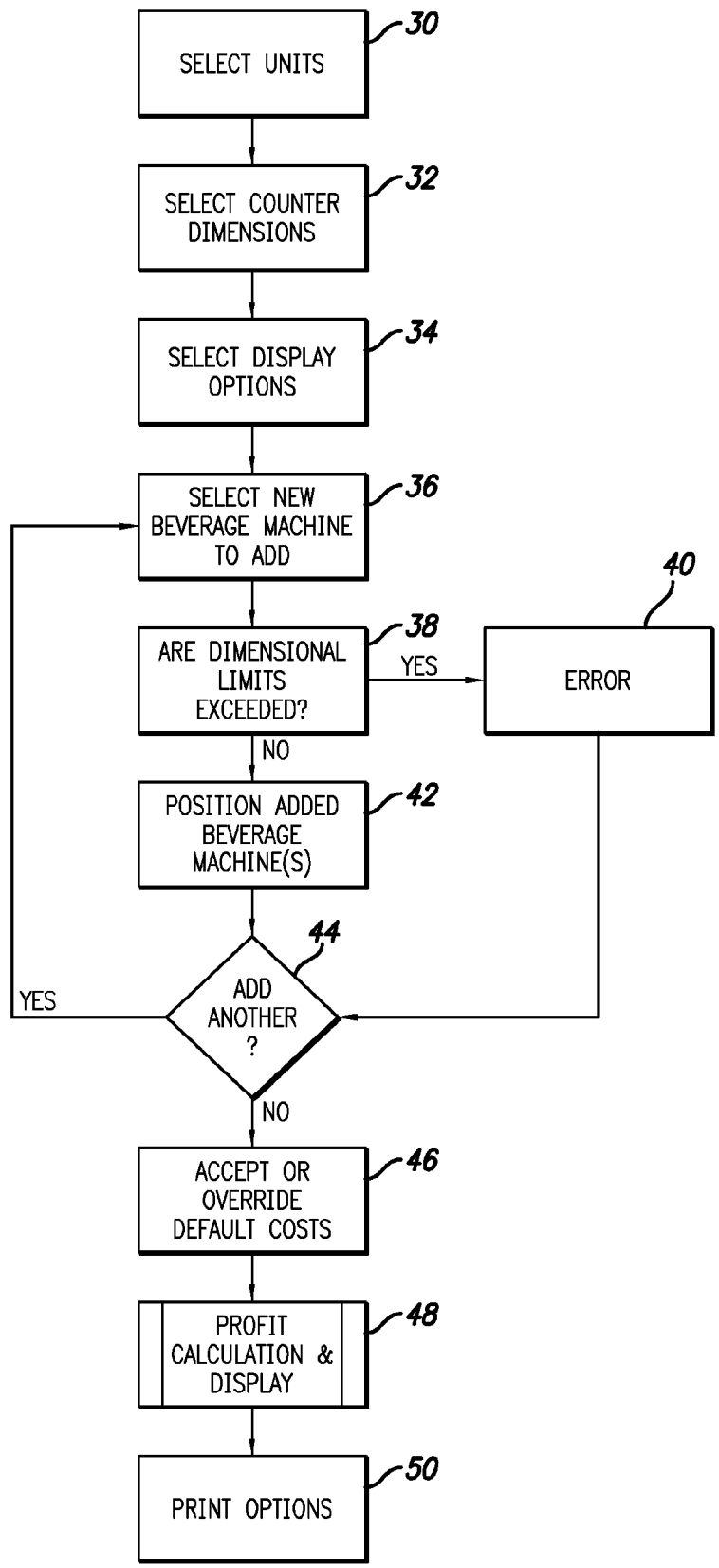
FIG. 1 is a simplified diagrammatic overview of the steps in the method for using a beverage bar design, development, and analysis system.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

The term "beverage machine" or "beverage machine" as used throughout this disclosure is meant to generally refer to beverage making apparatuses including but not limited to coffee makers, coffee brewers, coffee grinders, juice machines, frozen beverage machines, hot water machines, and soup dispensers. Further, as noted above, this term is meant to be representative of a type of machine although any type or variety of machine may be contemplated by this application.

Figure 2:
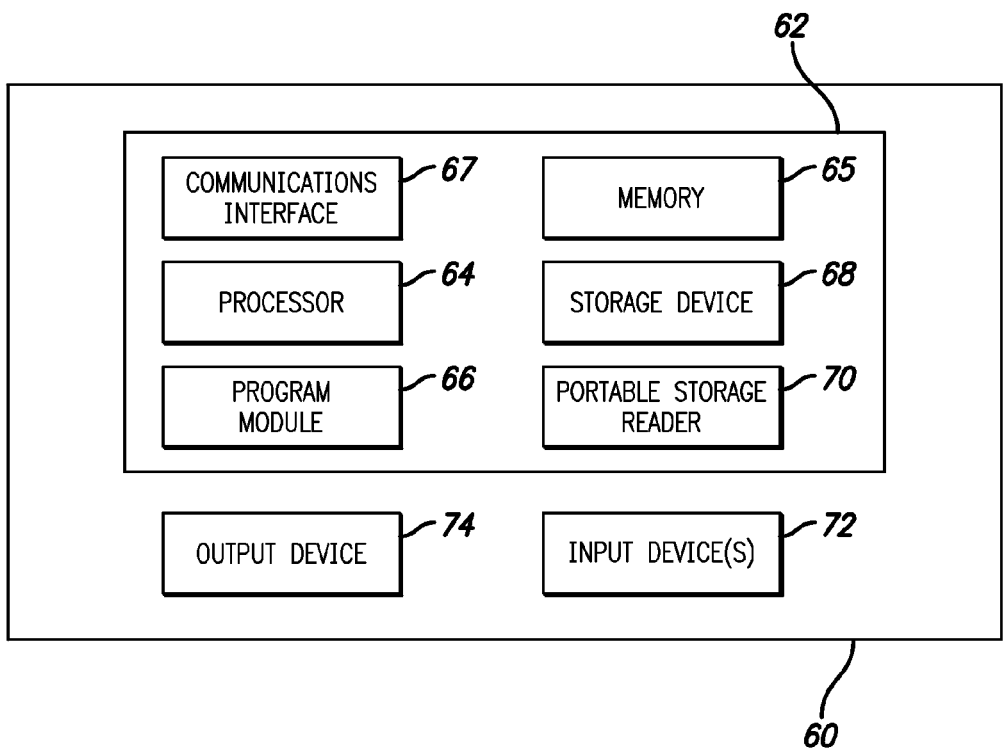
FIG. 2 is a simplified diagrammatic view of the beverage bar design, development, and analysis system.

With reference to the figures, FIG. 2 shows the components of a system 60 for designing, developing, and analyzing a virtual beverage bar. The bar is "virtual" because it exists at least initially in electronic format for display on an output device 74. In one embodiment, the system 60 is implemented using a programmed general purpose computer 62 which includes a processor 64, memory 65, a storage device 68, either on-board or remote, such as hard drive, tape drive, or floppy disk, and a program module 66 stored on the storage device 68. In such an embodiment, the system 60 would also include one or more output devices 74 such as a monitor or printer, and one or more input devices 72 such as, for example, a keyboard, mouse, touch display or voice control. The system 60 may also include a communications interface 67 such a network port, network card, or modem, usable with any combination of wired or wireless connections, for communicating with other computers.

The processor 64 is programmed to operate using instructions received from the software module 66 which may be loaded on the system using a portable storage reader 70 such as, including but not limited to, a CD-ROM, DVD-ROM, or floppy disk drive, or may be loaded from the memory 65. The term "module" referenced in this disclosure is meant to be broadly interpreted and broadly cover various types of software code including but not limited to routines, functions, objects, libraries, classes, members, packages, procedures, methods, or lines of code together performing similar functionality to these types of coding.

In another embodiment, the system 60 may be an integrated device such as a laptop computer, tablet PC, or handheld device such as a personal digital assistant. In such an embodiment, one or more the components mentioned above may be built into the system 60.

It is also envisioned that the present system 60 can be embodied on an Internet based system for use by multiple users simultaneously and remote storage and retrieval of information. It is also envisioned that the system 60 can be implemented using as an ASP model. The present system may also be used to connect a user via a communication network, such as the Internet, to an interface, such as a web site, of a seller or manufacturer of the equipment. The system may also be used to generate an email to a seller or manufacturer requesting information about equipment, or to order equipment.

In use, system 60 operates according to the method show in FIG. 1. The method is described hereinafter by describing steps as shown in FIG. 1 along with screenshot examples as shown in other referenced figures. These screenshots are shown for illustrative purposes only as one type of interface used to perform the method. The actual screen displays may differ while still embodying the method disclosed.

Figure 3:
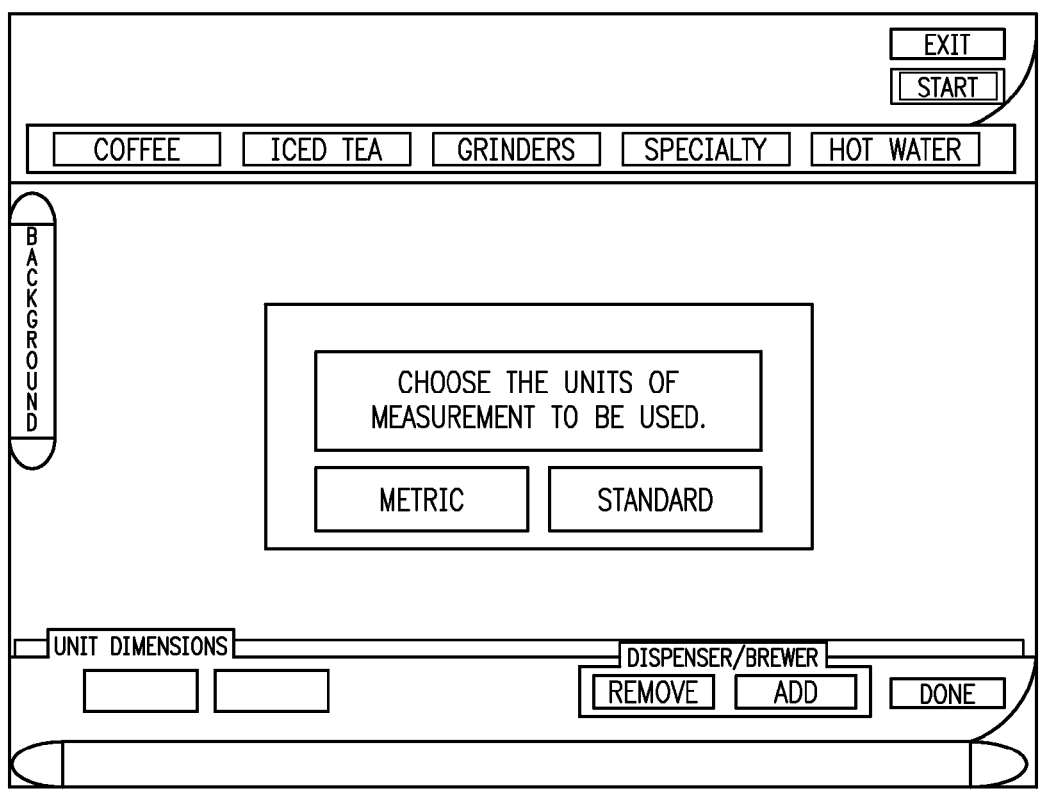
FIG. 3 is a screenshot of an embodiment of a beverage bar design, development, and analysis software product showing a choice between systems of measurement.
Figure 4:
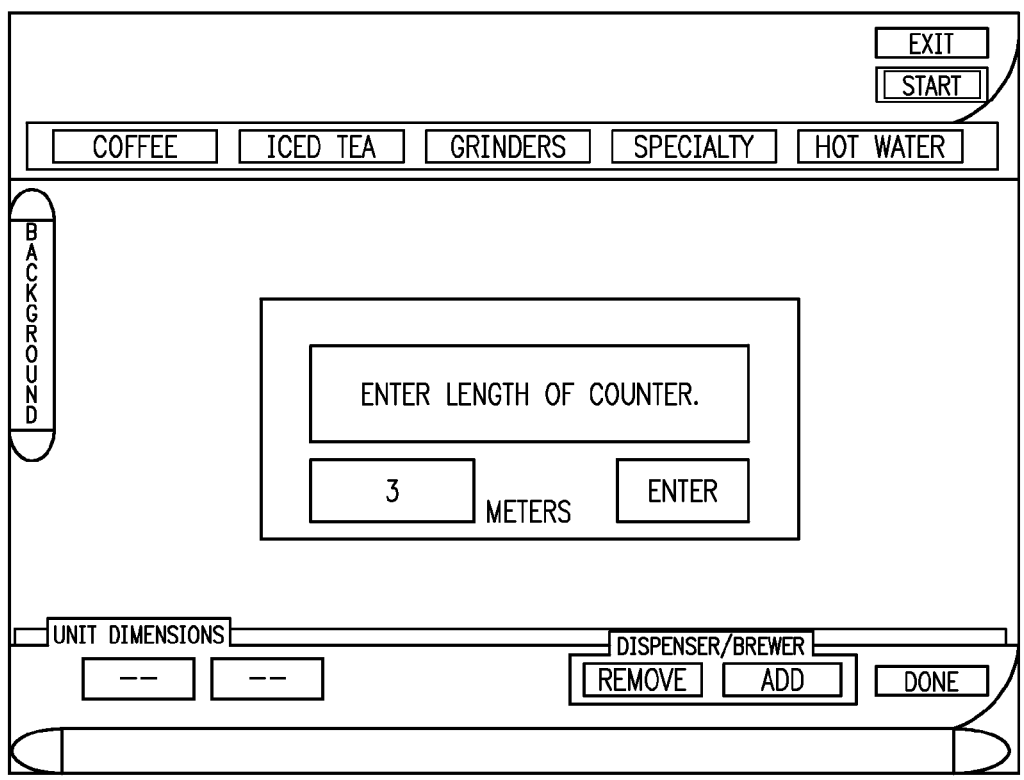
FIGS. 4, 5, 6 are screenshots of an embodiment of a beverage bar design, development, and analysis software product showing a choice of counter length, counter depth, and clearance above counter, respectively.
Figure 5:
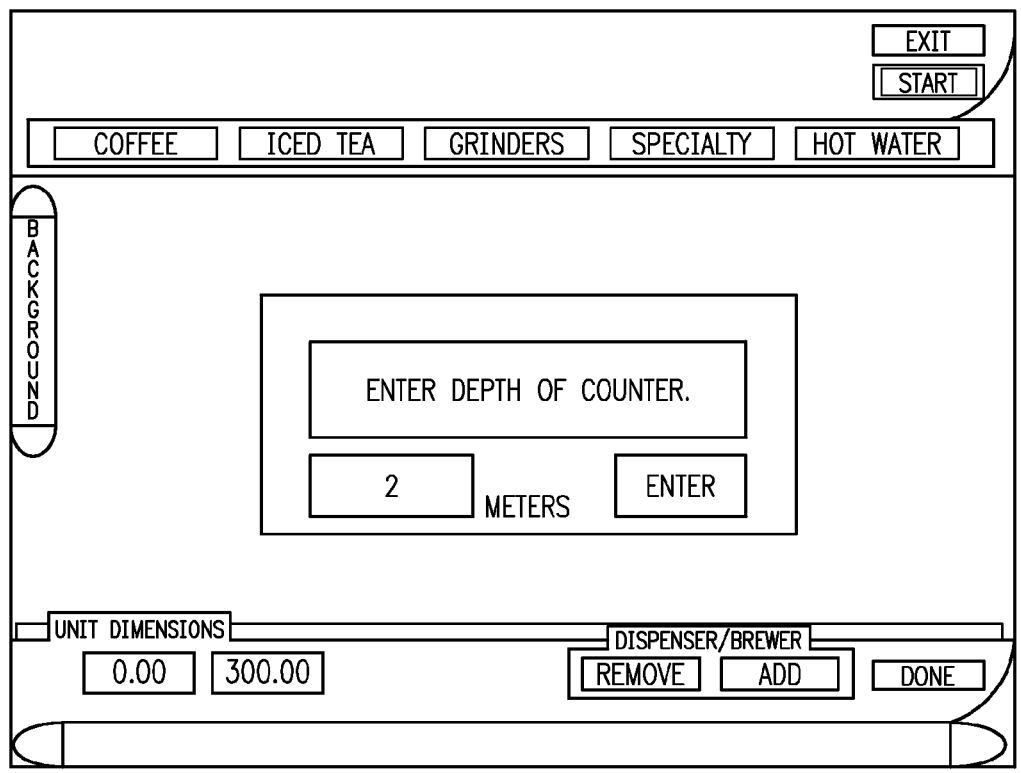
Figure 6:
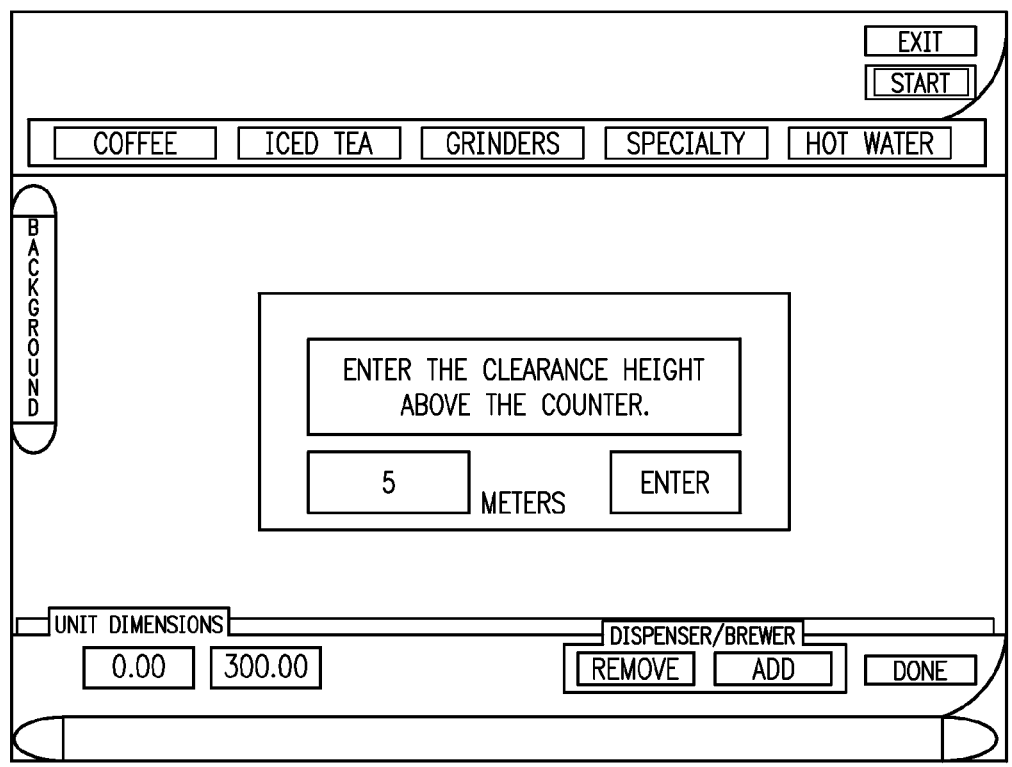
Figure 7:
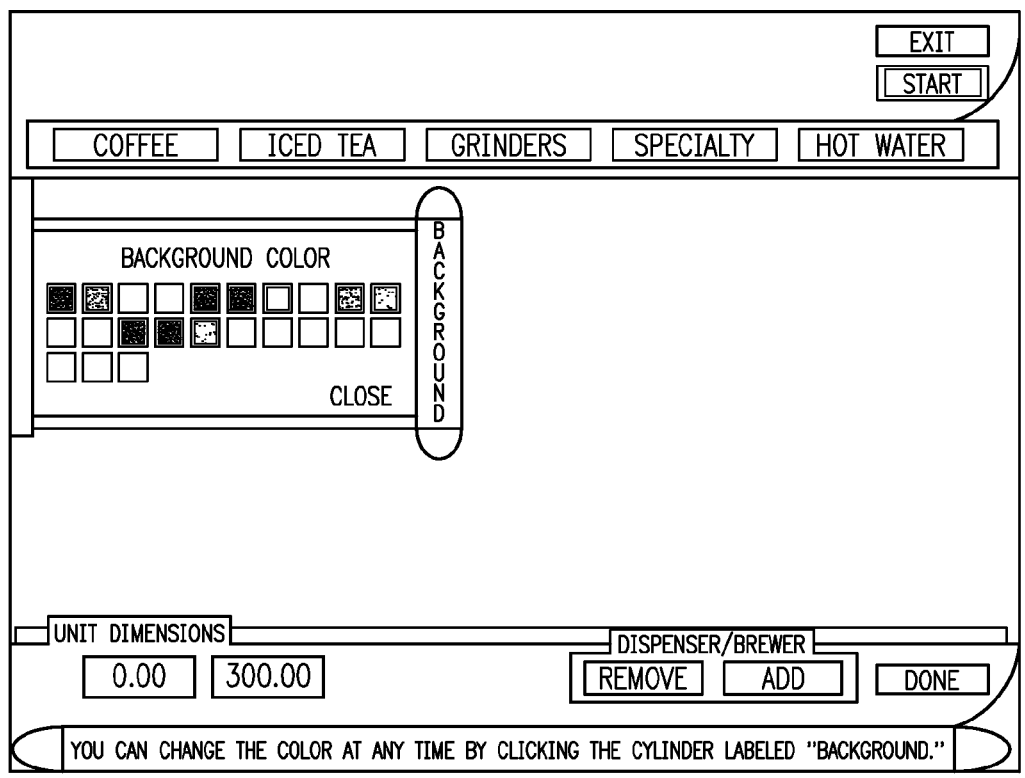
FIG. 7 is a screenshot of an embodiment of a beverage bar design, development, and analysis software product showing a choice of background color.

First, several space-determining values are established through a series of dialogs. Each of these values may be retrieved from a set of default values or be entered by a user. The user selects a system of units 30 to be used in the measurement or calculations to determine the number of beverage machines that fit on the surface that will act as the beverage bar of a predetermined size. As shown in FIG. 3, the system of units 30 may be metric or English (U.S. customary system), or any other suitable system. Next, the user chooses a surface area value by accepting default area dimensions 32 for the surface on which the beverage machines are placed, or overriding the values as desired. A length dimension, width dimension, and clearance dimension are confirmed or entered as shown in FIGS. 4, 5, and 6. Display options 34 may also be selected, such as selecting a background color as exemplified in FIG. 7. This may be useful to help the user recognize and understand the appearance of the beverage bar he is working with since he may be able to choose a color similar to the intended setting for the beverage bar.

Figure 8:
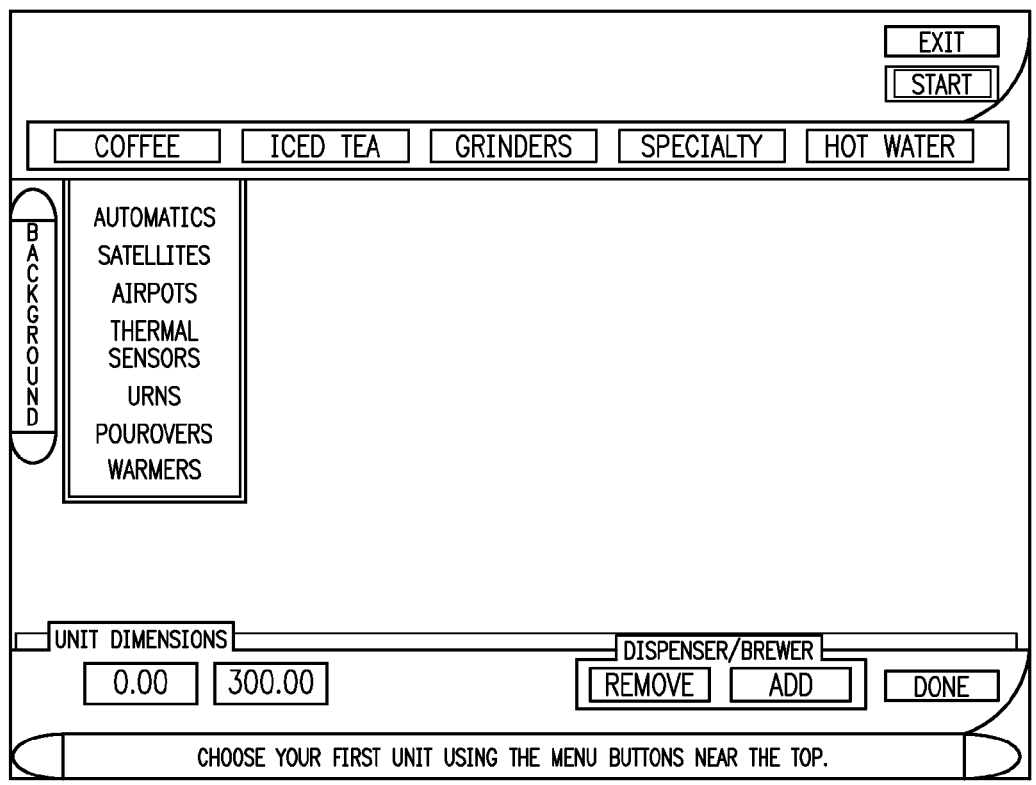
FIG. 8 is a screenshot of an embodiment of a beverage bar design, development, and analysis software product showing a top menu for selecting beverage machines.

An initially empty graphical representation of the surface is then shown (FIG. 8) with several menus and running totals of used space versus available space (see lower left). The open space value is initially set to the surface area value. In the embodiment shown in FIG. 8, buttons for adding beverage machines are selected or clicked (see lower right), followed by selecting a particular beverage machine through a series of menus representing different types of beverage machines. A selection step 36 is performed by clicking on one of the types of beverage machines which may include those shown in FIG. 8 (Coffee, Iced Tea, Grinders, Specialty, Hot Water), but which may include or be organized in various other categories as well without departing from this selection step 36.

Figure 9:
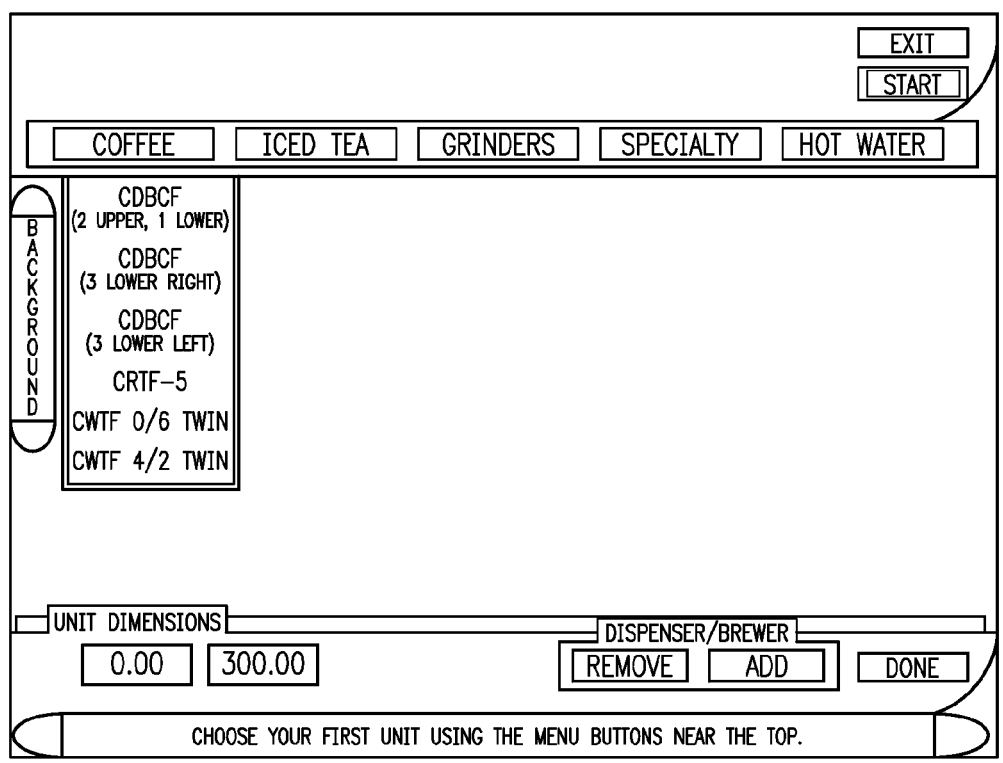
FIG. 9 is screenshot of an embodiment of a beverage bar software product showing a second menu which is based on a selection made at the top menu of FIG. 8.
Figure 10:
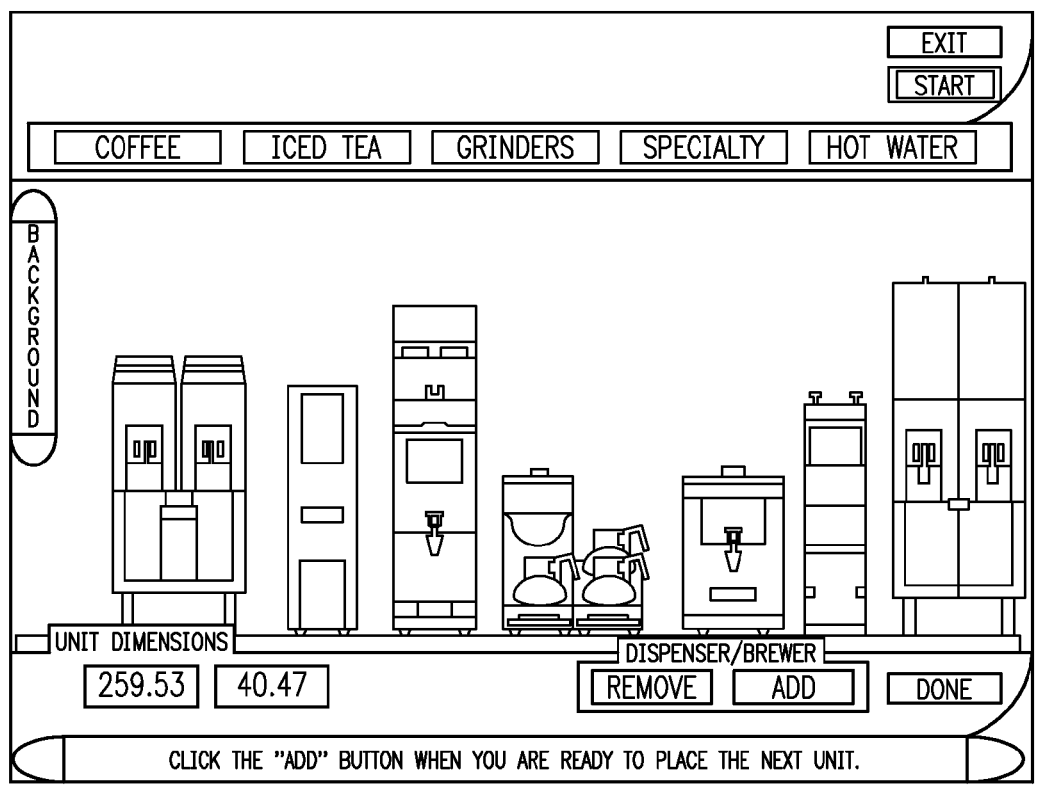
FIG. 10 is a screenshot of beverage bar with a variety of beverage machines positioned thereon.

As an example, when clicking on the "Coffee" category, a drop down list showing the various sub-categories (Automatics, Satellites, Airpots, Thermal Servers, Urns, Pourovers, and Warmers) is produced. Selecting "Automatics" produces a list of automatic coffee machines as shown in FIG. 9. Clicking on a particular piece of equipment causes a graphical representation of the selected beverage equipment to be shown in the virtual beverage bar that can be positioned 42 anywhere on the bar using an input device 72. Additional beverage machines may be added 44, moved around, or removed until the user is satisfied. FIG. 10 shows a virtual beverage bar with several beverage machines positioned thereon.

It is envisioned that variations of the drop down lists shown may be used such as including a thumbnail graphic of the beverage machine. Also envisioned is a dialog box being displayed requesting criteria to help select a particular beverage machine to include in the beverage bar.

Figure 11:
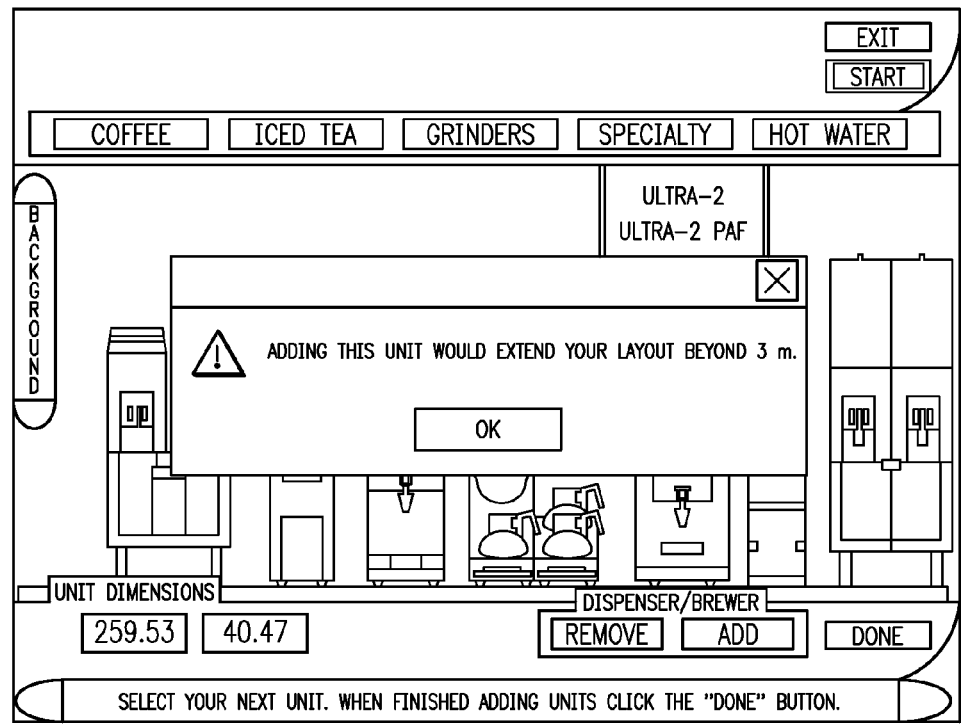
FIG. 11 is a screenshot of an error message shown when dimensional limits are exceeded.

Before each beverage machine selection 36, the system 60 performs an error check 38 to determine whether the space demand value, i.e. the amount of space or envelope needed to fit a piece of equipment having the length and width of the selected piece of equipment, exceeds the amount of open space remaining. The system calculates the open space value by initially setting it to the surface area value, and then iteratively reducing the open space value by a used space value. The used space value is the sum of the space demand values of each piece of placed beverage equipment. An error message 40, such as the error message shown in FIG. 11, may be displayed if the user attempts to place a piece of equipment that would cause the open space value to become negative. In another embodiment, the system 60 may simply reject placement of the additional beverage machine on the virtual beverage bar.

Figure 12:
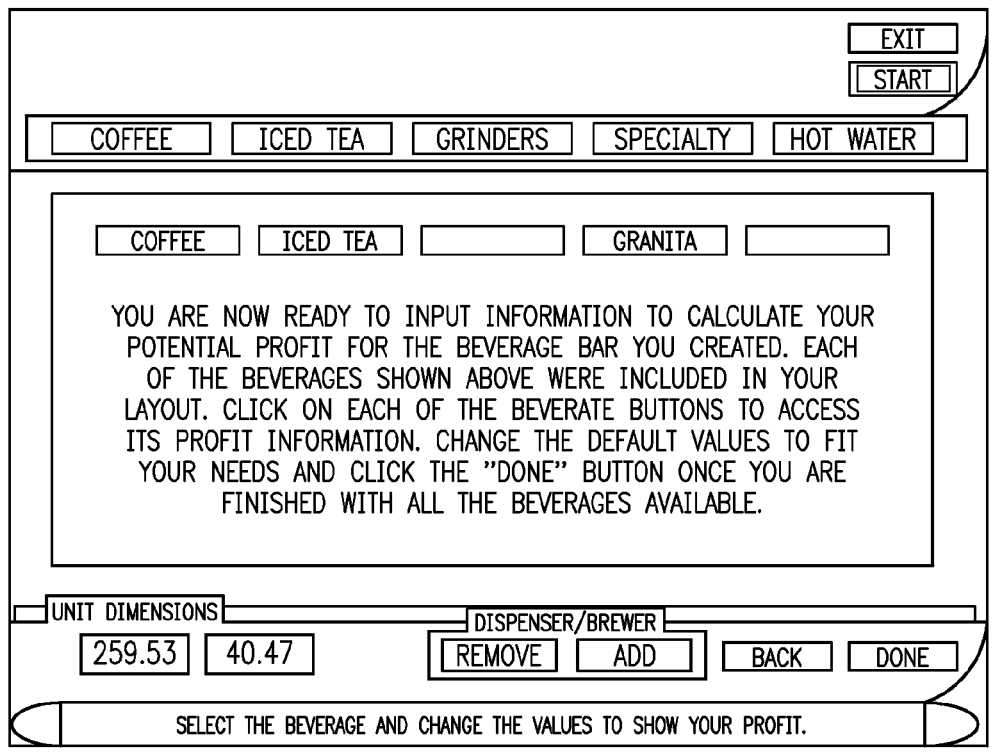
FIG. 12 is a screenshot of instructions provided prior to accepting or overriding cost information for selected types of beverage machines.

When the user is satisfied, which may be indicated by the user by clicking on the "Done" button shown in FIG. 10, the user is then able to accept or override default costs and serving information 46 related the types of selected beverage machines. An instruction screen like the screen shown in FIG. 12 may be displayed to provide instructions regarding this ability. The values entered are used to calculate a cost value for the beverage bar configuration, the cost value being the raw material and/or equipment expenses related to running the beverage bar, and a projected income value for the beverage bar configuration, the projected income value being an income expected to be generated based on product pricing. As shown in FIG. 13, the information 46 may include, but is not limited to, a cost per unit value, a serving size, percent refills, projected number of daily refills value, number of locations value, price per serving value, projected number of daily sold servings value, and a projected charge per refill value. As these values are changed, the profit for a particular period, which is one year in the example shown in FIG. 13, is displayed as a profitability report. Other periods such as a monthly, quarterly, daily, weekly, and so forth may also be used.

These settings are beverage machine type specific because the raw materials and other beverage-machine related information 46 differ depending on the type of beverage bar machine. In one embodiment shown in FIG. 13, information 46 may be adjusted for each of the beverage machine type shown (Coffee, Iced Tea, and Granita). This ability to adjust the information 46 allows a user/Owner to analyze different pricing scenarios for the product sold. The profit value for a particular time period, such as for a year, is immediately displayed allowing a user to make predications, and other related business decisions, regarding how the beverage bar is to be implemented.

Although default values are provided, users may wish to adjust or override these values for a variety of reasons. One example is to adjust "cost per ounce," as shown in FIG. 13, based on the amount of coffee used for a particular brew. A user may wish to use more or less coffee depending on regional preferences for coffee strength, the types of coffee used, recipe preferences, and the type of coffee brewed relating to the reputation of the restaurant or coffee provider. For example, the quantity of coffee used per brew may change depending on the type of roast, quality, and type of bean, flavoring added to the ground coffee, and whether the coffee is fresh ground or ground and packaged.

Figure 15:
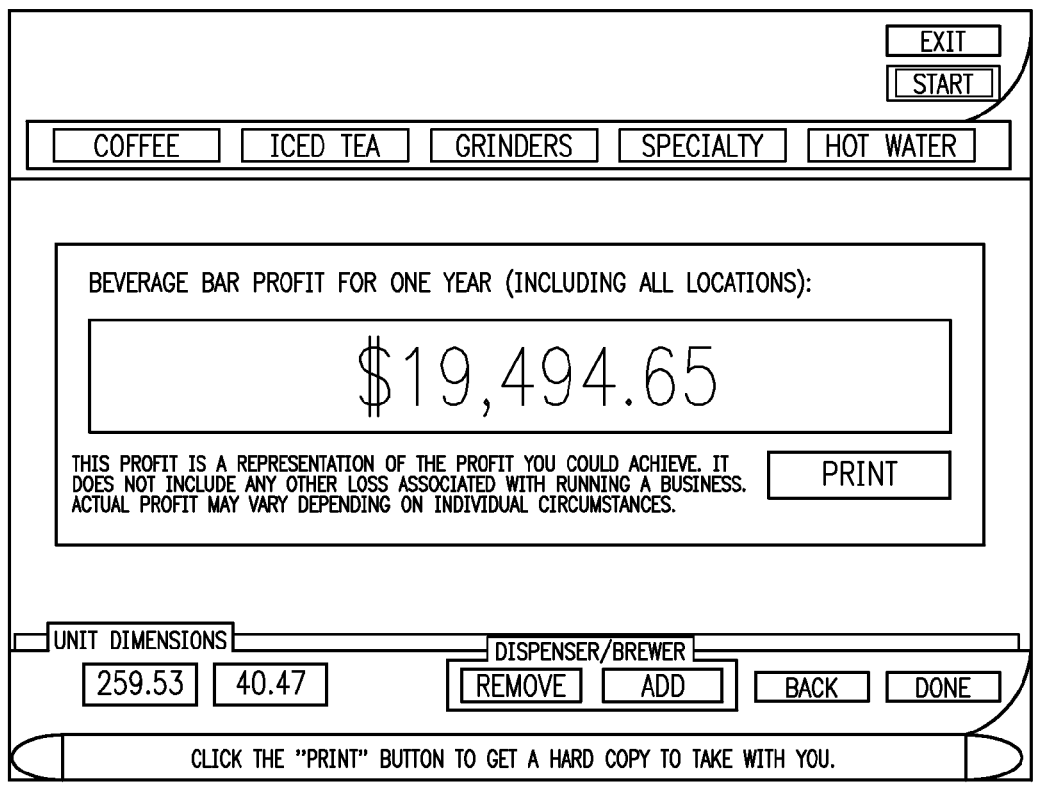
FIG. 15 is a screenshot reporting the total profit for the beverage bar as designed.
Figure 16:
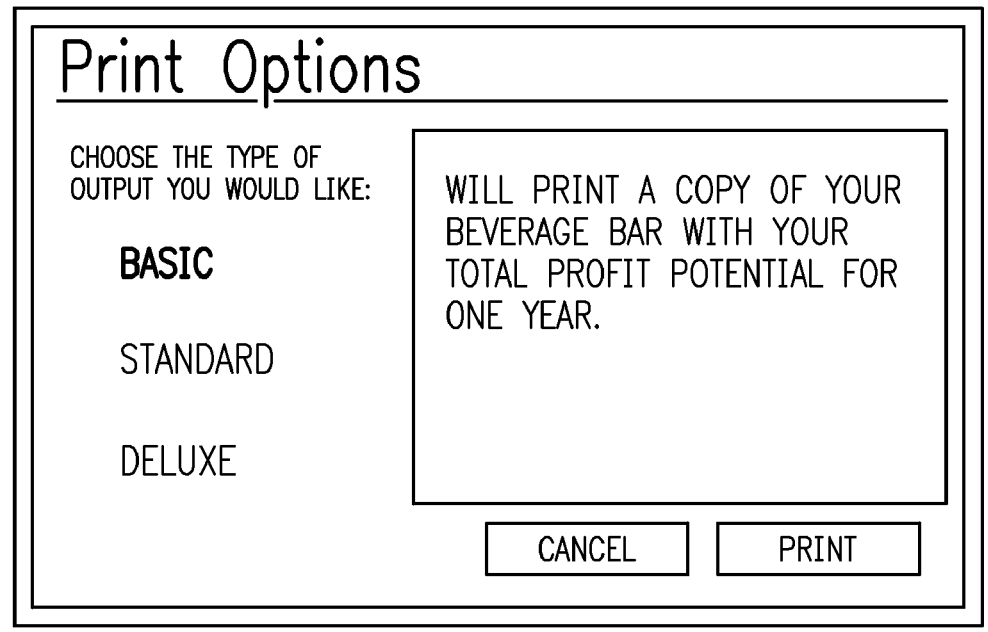
FIGS. 16, 17, & 18 are screenshots of options to print in a basic format, standard format, and deluxe format, respectively.
Figure 17:
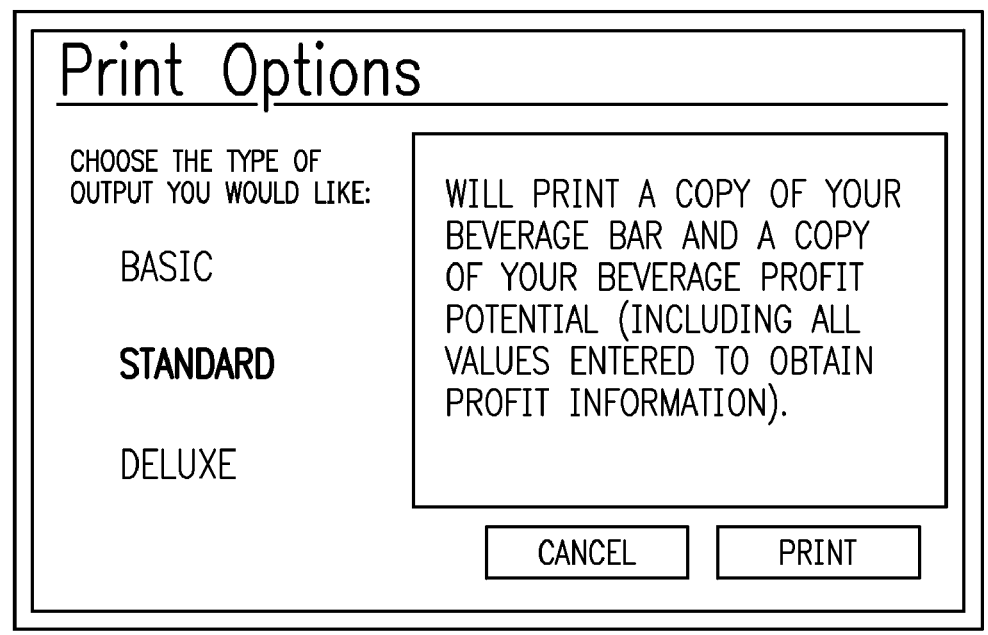
Figure 18:
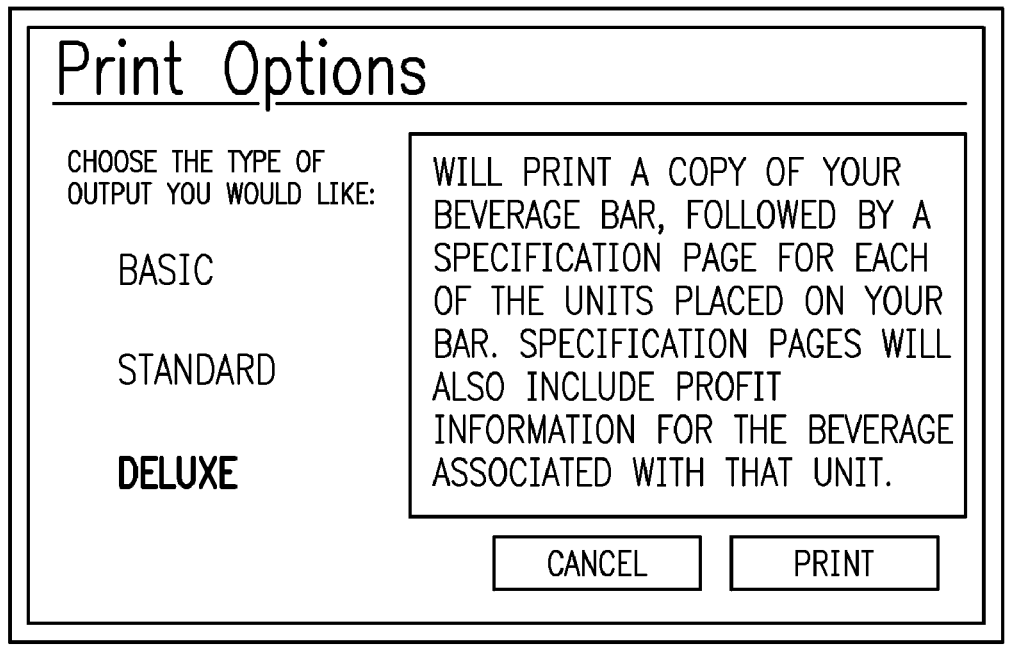
Figure 20:
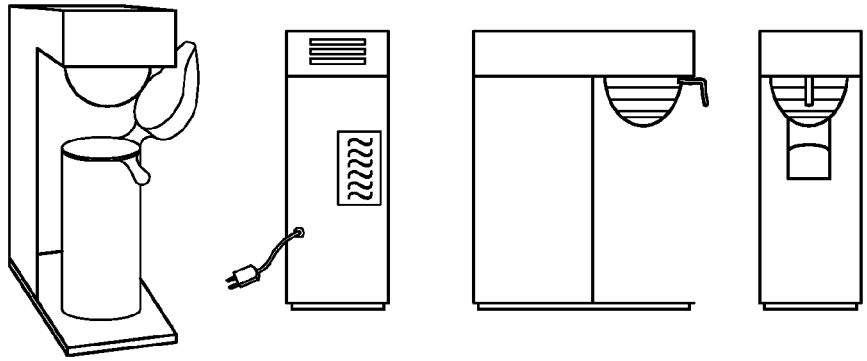

When the user is satisfied with the user's adjustments of the information 46, which may be relayed by clicking the "Total" button, the total beverage profit 48 is displayed as shown in FIG. 15. The user is then presented with print options 50. In the embodiment shown in the FIGS. 16-18, the print options 50 lead to printing different types of reports. The "basic" print option prints a report showing only the beverage bar along with the total profit 48. The "standard" print option adds a report showing the information 46 used in determining the total profit 48. Finally, the "deluxe" print option includes specification sheets, such as those shown in FIGS. 19-20, for each beverage machine included in the beverage bar.

Figure 22:
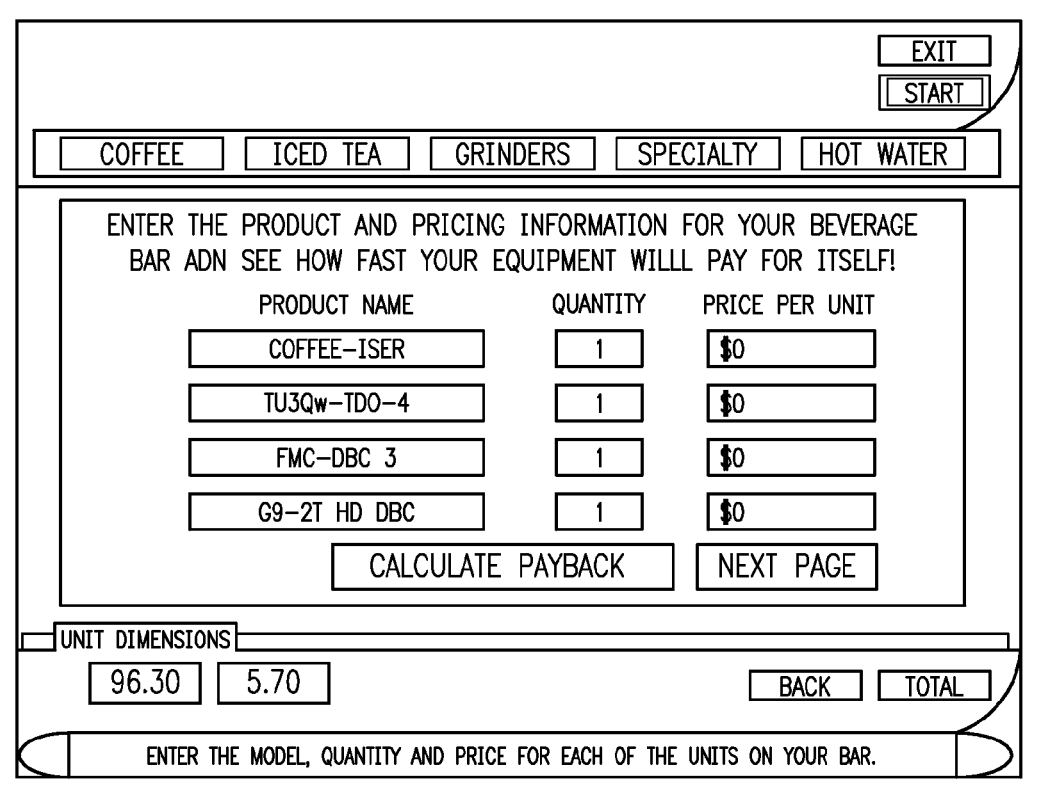
Figure 23:
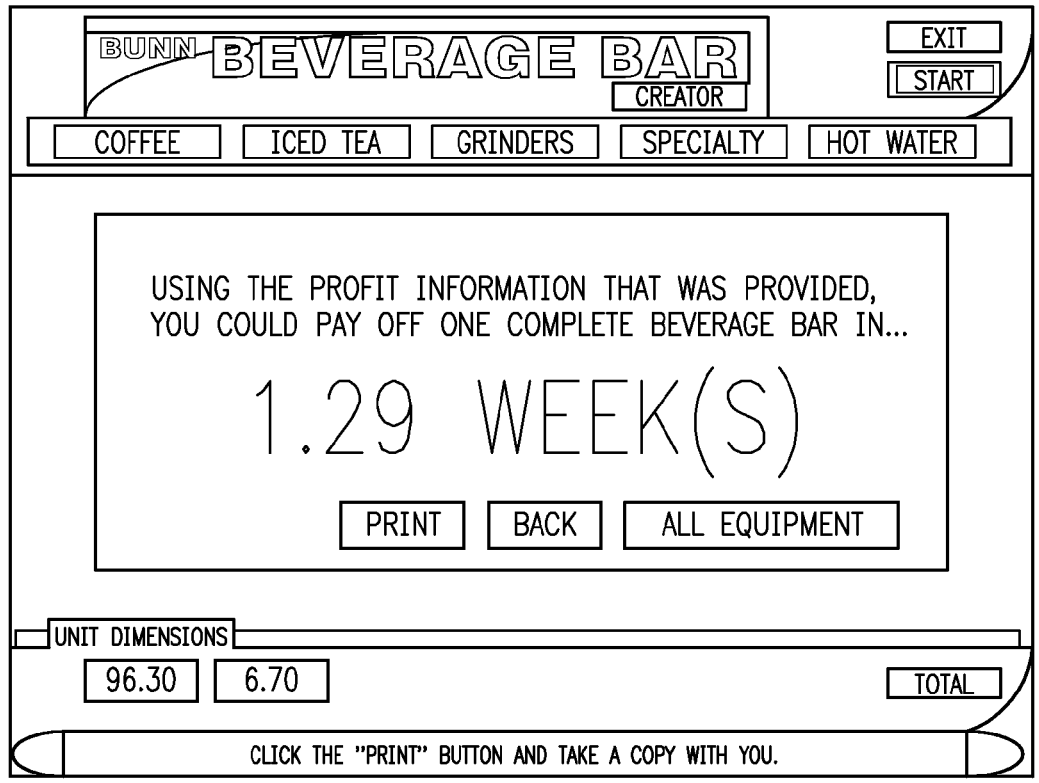
FIG. 23 is a screenshot showing the time in which the cost of the selected beverage equipment is paid back as a result of the beverage bar's profits.

In another embodiment, a "Payback Calculator" feature may be utilized. This feature may be activated in the screen showing the beverage bar profit as shown in FIG. 21. The payback calculator allows a user to input beverage machine pricing information to show the user how long the user must own the equipment, for the user's set cost parameters, in order to recoup the price of the beverage machines selected for the beverage bar. This time period is herein referred to as a "pay-for-time period value." FIG. 22 shows an example of one embodiment of such a beverage machine price input screen. In this example, price per unit is inputted in the "Price per Unit" column for the corresponding beverage machine shown in the "Product Name" column. As shown, unit quantity may be updated as well. As shown in FIG. 23, the payback calculator feature reports the number of weeks before the profit pays off the price of the equipment selected to be included in the beverage bar. Although weeks are shown, the time units may be in days, months, years, or other time units as appropriate.

A computer program product, which may distributed by, for example, a disk, CD-ROM, DVD, or other computer-readable medium, or via download, or otherwise by a modulated signal, may also be an embodiment of the above system and method. The computer program product may be composed of a number of modules programmed to request the inputs, communicate with a processor to process the calculations, communicate with an output device to display the results, and to perform the other functions needed to design and analyze a beverage bar.

With the functional descriptions provided above, one skilled in the art can use a variety of software authoring products, such as, for example, a programming language such as C++, to produce code to programmably operate the system 60. The computer program product may also be designed to operate the system across a communications network, such as the Internet, and to allow multiple users thereon. The computer program product may be fixed in a variety of mediums such as floppy disk, CD-ROM, or DVD-ROM.

While embodiments of the disclosure are shown and described, it is envisioned that those skilled in the art may devise various modifications and equivalents without departing from the spirit and scope of the disclosure as recited in the following claims.

What is claimed is:

1. A computer-implemented method for planning a virtual arrangement of beverage equipment on a virtual countertop work surface, the method comprising the steps of:

providing an interface having a graphical representation of the virtual countertop work surface;

selecting a virtual countertop work surface area value, the virtual countertop work surface area value being an area having at least one of a width dimension and a length dimension;

setting an open space value to the virtual countertop work surface area value;

providing on the interface a graphical representation of at least one piece of beverage equipment for placement on the virtual countertop work surface;

attributing a space demand value to each piece of selected beverage equipment;

iteratively allowing a user to select a piece of beverage equipment and place a graphical representation of the selected beverage equipment onto the graphical representation of the virtual countertop work surface;

iteratively calculating a used space value by taking a sum of the space demand values for each piece of selected beverage equipment; and iteratively recalculating the open space value by subtracting the used space value from the virtual countertop work surface area value.

2. The method of claim 1, further comprising calculating the space demand value by multiplying a length dimension by a width dimension for the selected equipment.

3. The method of claim 1, further comprising the step of preventing the user from placing the graphical representation of the beverage equipment if so doing would exceed the available open space on the graphical representation of the virtual countertop work surface.

4. The method of claim 1, further comprising allowing the user to at least one of delete or move one or more of the graphical representations of the selected pieces of beverage equipment.

5. The method of claim 1, further comprising allowing the user to move one or more of the placed graphical representations to alternative locations on the graphical representation of the virtual countertop work surface.

6. The method of claim 1, further comprising providing at least a graphical representation of a piece of beverage equipment as the type of equipment which can be selected.

7. A computer-implemented method for planning a virtual arrangement of beverage equipment on a surface having a selected area value and projecting income related to the arrangement, the method comprising the steps of:

providing an interface having a graphical representation of the virtual countertop work surface;

selecting a virtual countertop work surface area value, the virtual countertop work surface area value being an area having at least one of a width dimension and a length dimension;

setting an open space value to the virtual countertop work surface area value;

providing on the interface a graphical representation of at least one piece of beverage equipment for placement on the virtual countertop work surface;

iteratively allowing a user to select a piece of equipment and place a graphical representation of the selected beverage equipment onto the graphical representation of the virtual countertop work surface to create a particular equipment configuration;

attributing a space demand value to each piece of selected beverage equipment;

iteratively calculating a used space value by taking a sum of the space demand values for each piece of selected beverage equipment;

iteratively recalculating the open space value by subtracting the used space value from the virtual countertop work surface area value;

assigning a cost value to the beverage equipment configuration;

calculating a projected income value for the beverage equipment configuration; and displaying a profitability report based on the cost value and projected income value.

8. The method of claim 7, further comprising the step of calculating the cost value by referencing a cost per unit value entered by the user.

9. The method of claim 7, further comprising the step of calculating the cost value by referencing to a cost per unit value retrieved from a set of default values.

10. The method of claim 9, further comprising allowing the user to override one or more of the set of default values.

11. The method of claim 7, further comprising having the step of calculating an income be referencing a projected price per serving value and a projected number of daily sold servings value.

12. The method of claim 11, further comprising allowing the user to modify the projected price per serving value and the projected number of daily sold servings value.

13. The method of claim 11, further comprising calculating and displaying a pay-for-itself time period value for a selected piece of beverage equipment in the beverage bar configuration.

14. The method of claim 11, further comprising referencing a projected number of daily refills value and a projected charge per refill value to determine the income value.

15. The method of claim 7, further comprising having a printout including a specification sheet for each piece of selected equipment in the equipment configuration.

16. The method of claim 15, further having the specification sheet include a profit value for a particular period attributed to the piece of selected equipment.

17. The method of claim 7, further having the profitability report include a profit value for a selected time period, the profit calculation value being calculated for all selected beverage equipment in the virtual beverage equipment configuration.

18. The method of claim 7, further comprising providing at least a graphical representation of a piece of beverage equipment as the type of equipment which can be selected.

19. A computer-implemented method for planning a virtual arrangement of beverage equipment on a virtual countertop work surface having a selected area value and projecting income related to the arrangement, the method comprising the steps of:

providing an interface having a graphical representation of the virtual countertop work surface;

selecting a virtual countertop work surface area value, the virtual countertop work surface area value being an area having at least one of a width dimension and a length dimension;

setting an open space value to the virtual countertop work surface area value;

providing on the interface a graphical representation of at least one piece of beverage equipment for placement on the virtual countertop work surface;

attributing a space demand value to each piece of selected beverage equipment;

iteratively allowing a user to select a piece of beverage equipment and place a graphical representation of the selected beverage equipment onto the graphical representation of the virtual countertop work surface to create a particular equipment configuration;

iteratively calculating a used space value by taking a sum of the space demand values for each piece of selected beverage equipment;

iteratively recalculating the open space value by subtracting the used space value from the virtual countertop work surface area value;

assigning a cost value to the equipment configuration;

calculating a projected income value for the equipment configuration;

displaying a profitability report based on the cost value and projected income value; and allowing the user to connect via a communication network to an interface for purchasing at least one of the pieces of beverage equipment in the beverage equipment configuration.

20. The method of claim 19, further comprising having the interface for purchasing be a web site of a seller of the equipment in the equipment configuration.

21. The method of claim 19, further comprising generating an email to a selected seller of the beverage equipment in the beverage equipment configuration requesting information about the equipment in the equipment configuration.

* * * * *